(12) United States Patent
Satish et al.

(10) Patent No.: US 7,877,800 B1
(45) Date of Patent: Jan. 25, 2011

(54) PREVENTING FRAUDULENT MISDIRECTION OF AFFILIATE PROGRAM COOKIE TRACKING

(75) Inventors: Sourabh Satish, Fremont, CA (US); Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 1360 days.

(21) Appl. No.: 11/313,184

(22) Filed: Dec. 19, 2005

(51) Int. Cl.
*G06F 21/00* (2006.01)

(52) U.S. Cl. .............................. 726/22; 726/23; 726/24; 726/25

(58) Field of Classification Search ............... 726/22–25
See application file for complete search history.

(56) References Cited

U.S. PATENT DOCUMENTS

| | | | |
|---|---|---|---|
| 6,088,803 A | 7/2000 | Tso et al. | |
| 6,314,409 B2 | 11/2001 | Schneck | |
| 6,772,345 B1 * | 8/2004 | Shetty | 726/24 |
| 6,792,543 B2 * | 9/2004 | Pak et al. | 726/24 |
| 6,928,553 B2 | 8/2005 | Xiong et al. | |
| 2002/0083343 A1 | 6/2002 | Crosbie | |
| 2002/0087882 A1 | 7/2002 | Schneier et al. | |
| 2002/0157020 A1 | 10/2002 | Royer | |
| 2003/0037251 A1 | 2/2003 | Frieder et al. | |
| 2003/0051026 A1 | 3/2003 | Carter | |
| 2003/0163563 A1 * | 8/2003 | Bean | 709/224 |
| 2004/0187023 A1 * | 9/2004 | Alagna et al. | 713/200 |
| 2006/0123478 A1 * | 6/2006 | Rehfuss et al. | 726/22 |
| 2007/0050245 A1 * | 3/2007 | Humphries et al. | 705/14 |
| 2007/0094732 A1 * | 4/2007 | Mood et al. | 726/24 |

FOREIGN PATENT DOCUMENTS

WO  WO 01/71499 A1   9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

(Continued)

*Primary Examiner*—Nasser Moazzami
*Assistant Examiner*—Ghazal Shehni
(74) *Attorney, Agent, or Firm*—Fenwick & West LLP

(57) ABSTRACT

A cookie monitoring manager detects fraudulent updates to cookies on a computer. The cookie monitoring manager monitors cookies, and detects attempted write operations thereto. The cookie monitoring manager determines whether each detected attempted write operation is an attempt to write a fraudulent affiliate identifier to a cookie. The cookie monitoring manager detects fraudulent write attempts, for example, by detecting an attempt to write a known fraudulent affiliate identifier to a cookie, by detecting an attempt to write to a cookie by a process other than a browser or by detecting multiple attempts to write affiliate identifiers to a cookie within a sufficiently short period of time. When the cookie tracking manager detects an attempt to write a fraudulent affiliate identifier to a cookie, it can block the write attempt and/or run an adware removal program on the computer.

26 Claims, 4 Drawing Sheets

OTHER PUBLICATIONS

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console for Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245-pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating 9/00 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&sub-item=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0&sub-item=4&subitem=13>, 3 pages, Czech Republic.

"SSL Stripper Installation Guide," [online]. Retrieved in Mar. 2005 from the Internet: <URL: http://www.sslstrippercom>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?l...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index ...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

PREVENTING FRAUDULENT MISDIRECTION OF AFFILIATE PROGRAM COOKIE TRACKING

TECHNICAL FIELD

This invention pertains generally to computer security, and more specifically to detecting fraudulent updates to cookies on computers.

BACKGROUND

Cookie tracking is a popular method to track web visitors who linked to a commercial website and made a purchase. Cookies allow a web merchant to track from where such visitors linked to the merchant's site, and pay out a referring commission to the host of the originating website.

To implement cookie tracking, a third-party affiliate software program is installed as a stand-alone product requiring minimal changes to the website that will include the referring links. The affiliate software places links to the commercial sites on the hosting website. When a web visitor clicks an affiliate link, the affiliate tracking software is activated. The affiliate tracking software instructs the web visitor's browser to write a small text file or "cookie" to the web visitor's computer. This cookie stores the affiliate identifier of the hosting website. It may also store other information such as the date/time for purposes of tracking how much time elapsed between the click and a resulting purchase. It may also track the specific banner or link that the web visitor clicked. The cookie is also typically assigned an expiration date.

After the cookie is planted, the web visitor is redirected to the webpage that is the target of the specific banner or link that was clicked. This could be, for example, the homepage of the merchant's web site, or a' webpage with specific information concerning a product of interest to the visitor.

As the web visitor traverses the merchant's site, the cookie remains untouched and continues to hold the affiliate identifier. The cookie is retained until the expiration date, as defined by the affiliate tracking software. This allows merchants to track purchases even if they occur days or weeks after the first visit. Merchants can also track repeat sales from visitors. So long as a sale occurs before the cookie expires, the sale will be properly credited to the referring affiliate, by the use of the affiliate identifier.

Cookies make tracking affiliate-referred-sales very convenient. A cookie can be read and used on any webpage or form, and can be used in conjunction with almost any ordering system. Affiliate web marketing is discussed in greater detail in *The Super Affiliate Handbook: How I Made $436,797 Last Year Selling Other People's Stuff Online* by Rosalind Gardner, *Successful Affiliate Marketing for Merchants* by Shawn Collins, *The Complete Guide to Associate & Affiliate Programs on the Net: Turning Clicks Into Cash* by Daniel Gray and *Proven Tactics in Affiliate Marketing: 8 Case Studies* by MarketingSherpa.

Adware (sometimes called spyware or thiefware) is sometimes configured to illegitimately claim affiliate commissions, even when it had no involvement in bringing the user to the respective merchant. Such adware typically attempts to plant its own affiliate identifier in cookies, regardless of via what path the visitor linked to the merchant's website. In case of browser based adware, a common scenario is that responsive to a user clicking on a product link, the adware will popup a dual frame window and/or various other browser frames. The main frame may display a product competing with the product on whose link the user had clicked. Alternatively, two frames may simultaneously display websites of the product on whose link the user clicked and the competing product. The secondary frame(s) may be almost invisible, e.g., 0.1 pixel width, off-screen, hung browser instances, blank browsers, etc. Regardless, the adware, via one or more of its browser instances, sets the last affiliate identifier of any updated cookie to its own. In fact, in some cases the various invisible browser instances set the affiliate identifiers of any cookies they can find, on the basis of keywords, etc. Because the last set affiliate identifier determines who gets credit for the sale, the adware ensures that no matter which product the user buys, the adware vendor receives the commission.

Some adware bypasses the process described above and instead monitors cookies directly, to make sure that their own affiliate identifier is the last one set therein. Whenever such adware detects a cookie being created or updated, it adds its own affiliate identifier at the end.

What is needed are methods, systems and computer readable media for preventing fraudulent misdirection of affiliate program cookie tracking.

SUMMARY OF INVENTION

Computer-implemented methods, computer systems and computer-readable media detect fraudulent updates to cookies on a computer. A cookie monitoring manager monitors cookies, and detects attempted write operations thereto. The cookie monitoring manager determines whether each detected attempted write operation is an attempt to write a fraudulent affiliate identifier to a cookie. The cookie monitoring manager detects fraudulent write attempts, for example, by detecting an attempt to write a known fraudulent affiliate identifier to a cookie, by detecting an attempt to write to a cookie by a process which is not a browser or by detecting multiple attempts to write affiliate identifiers to a cookie within a sufficiently short period of time. When the cookie tracking manager detects an attempt to write a fraudulent affiliate identifier to a cookie, it can perform various corrective actions in responsive, such as blocking the write attempt and/or running an adware removal program on the computer.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
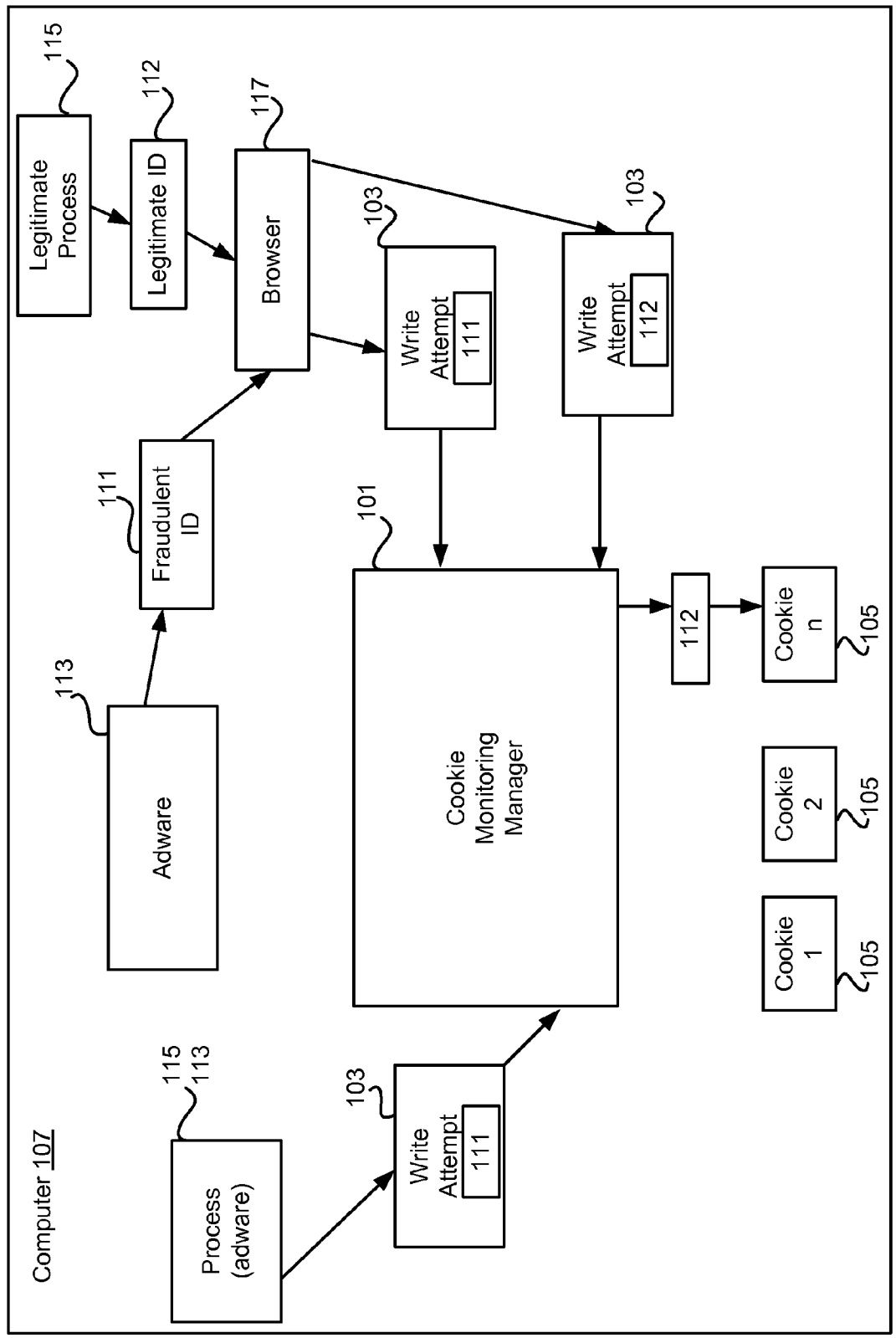
FIG. 1 is a block diagram illustrating a high level overview of a cookie monitoring manager detecting fraudulent updates to cookies on a computer, according to some embodiments of the present invention.

FIG. 1 illustrates a cookie monitoring manager 101 detecting fraudulent updates 103 to cookies 105 on a computer 107, according to some embodiments of the present invention. It is to be understood that although the cookie monitoring manager 101 is illustrated as a single entity, as the term is used herein a cookie monitoring manager 101 refers to a collection of functionalities which can be implemented as software, hardware, firmware or any combination of these. Where a cookie monitoring manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

It is to be understood that although this specification discusses the invention in terms of monitoring cookies 105 to detect and mange fraudulent updates 103, it is to be understood that the invention is of course not limited to monitoring cookies, but can equally well be applied to monitoring any type of object similarly used for affiliate program tracking. For example, in some embodiments the tracking objects monitored are not cookies 105 but flash objects. Any format or variety of file or data structure or other state tracking mechanism being used as a tracking object is within the scope of the present invention.

As illustrated in FIG. 1, the cookie monitoring manager 101 monitors cookies 105 for attempts 103 to write thereto. Cookies 105 are implemented as files. The implementation mechanics of monitoring for write operations to files is known by those of ordinary skill in the relevant art, and the use thereof within the context of the present invention will be readily apparent to those of such a skill level in light of this specification. For example, in one embodiment, the cookie monitoring manager 101 intercepts system calls to system write operations, and examines the intercepted calls to monitor for attempts 103 to write to known cookies 105. In another embodiment, the cookie monitoring manager 101 utilizes a file system filter driver (not illustrated) to monitor attempts 103 to write to known cookies 105.

The cookie monitoring manager 101 detects at least one attempted write operation to a cookie 105, which it determines comprises an attempt 103 to write a fraudulent affiliate identifier 111 to the cookie 105. In some instances, this determination is made when the cookie monitoring manager 101 detects an attempt 103 to write a known fraudulent affiliate 111 identifier to the cookie 105. Affiliate identifiers 111 are typically both unique and constant, since the merchants need to credit the referring parties with their sales commissions. Thus, the affiliate identifiers 111 used fraudulently by adware program 113 can be learned, and any attempt 103 to write these known fraudulent identifiers 111 to a cookie 105 can be detected by the cookie monitoring manager 101.

In other embodiments, the cookie monitoring manager 101 determines that a detected attempted write operation to a cookie 105 comprises an attempt 103 to write a fraudulent affiliate identifier 111 in other ways. For example, as explained above, adware 113 often detects a legitimate identifier 112 being written to a cookie 105, and then appends its fraudulent identifier 111. The cookie monitoring manager 101 can detect this by detecting multiple attempts 103 to write affiliate identifiers 111, 112 to the cookie 105 within a sufficiently short period of time. For course, the period of time to use is a variable design parameter that can be adjusted up or down as desired. In other embodiments, the cookie monitoring manager 101 monitor counts any attempt 103 to write to a cookie 105 by a process 115 other than a browser 117 as an attempt 103 to write a fraudulent identifier 111 to the cookie 105, as cookies 105 are really intended to be accessed by browsers 117 only.

It is understood by those of ordinary skill in the relevant art that different affiliate programs and networks available (see, e.g., http://www.affiliateguide.com/) use different formats of identifiers 111, 112 for tracking redirections at a cookie 105 level. The present invention can utilize any and all known formats for such information as desired. The cookie monitoring manager 101 can identify specifically formatted identifiers 111, 112 on a per affiliate program basis. Once a program's format is learned, this information can continue to be used over time. Each affiliate identifier 111, 112 for each vendor tends to be unique (or limited to very few values) and hence is very unlikely to change, so that the revenue realization can be accurately tracked.

For example, CommissionJunction (a popular affiliate program today) uses the affiliate identifier 111, 112 format of 'siteid=<value>' in cookies 105 to track affiliates. The specific <value> varies from vendor to vendor, but each vendor's identifier(s) 111, 112 will remain constant so that the business model can work. Therefore, once a specific vendor is known to be fraudulent, attempts 103 to write its specific vendor identifier 111 to cookies 105 can be identified and flagged as fraudulent activity.

As another example, LinkShare uses the following format within cookies 105:

lsn_qstring
[affiliate identifier]%3A42808%3A
linksynergy.com/Again, the [affiliate identifier] for each vendor will remain the same for LinkShare.

Figure 2:
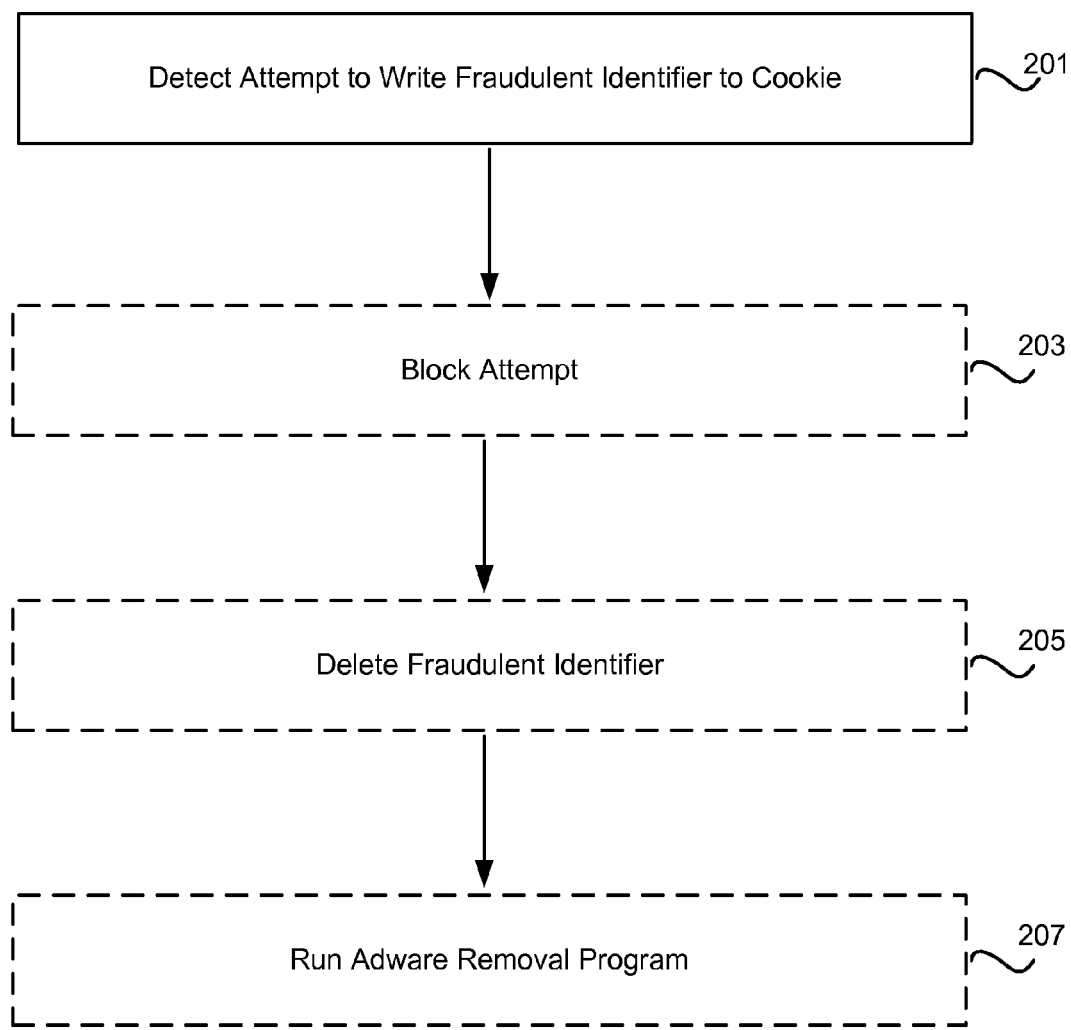
FIG. 2 is a flowchart illustrating steps for taking corrective actions in response to detecting a fraudulent update to a cookie, according to some embodiments of the present invention.

In different embodiments, the cookie monitoring manager 101 can perform different corrective actions responsive to detecting an attempt 103 to write a fraudulent affiliate identifier 111 to a cookie 105 as desired. For example, as illustrated in FIG. 2, when the cookie monitoring manager 101 detects 201 an attempt 103 to write a fraudulent affiliate identifier 111 to a cookie 105, the cookie monitoring manager 101 can block 203 the attempt 103, delete 205 a written fraudulent affiliate identifier 111 from the cookie 105 and/or run 207 an adware removal program 307 (not illustrated in FIG. 2) on the computer 107.

Figure 3:
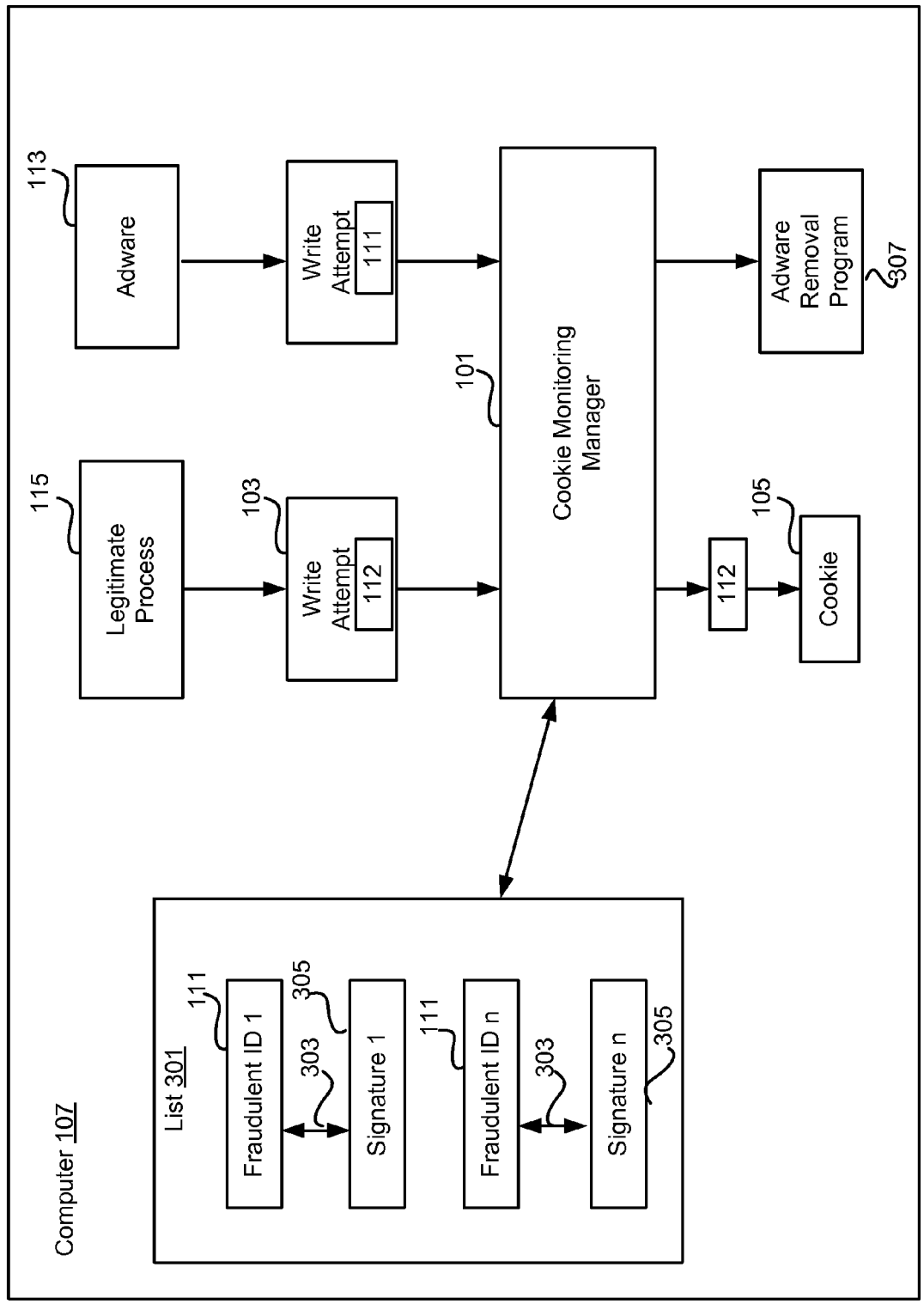
FIG. 3 is a block diagram illustrating the cookie monitoring manager utilizing a list of known fraudulent affiliate identifiers, according to some embodiments of the present invention.

As illustrated in FIG. 3, in some embodiments of the present invention, the cookie monitoring manager 101 maintains a list 301 of known fraudulent affiliate identifiers 111. The list 301 of known fraudulent affiliate identifiers 111 can be supplied in whole or in part from a centralized source of computer security data (not pictured), and/or provided by or edited at an enterprise or local level. In any case, known fraudulent affiliate identifiers 111 can be learned by watching the operation of known adware 113. In such embodiments, attempts 103 to write affiliate identifiers 111, 112 to cookies 105 are checked against the list 301 by the cookie monitoring manager 101, which thus detects attempts 103 to write known fraudulent identifiers 111 appearing on the list 301 to cookies 105.

In some embodiments, the list 301 can further include associations 303 between known fraudulent affiliate identifiers 111 and signatures 305 identifying associated adware programs 113. In such embodiments, the cookie monitoring manager 101 can run an adware removal program 307 to remove at least the adware program 113 with the associated identifying signature 303, responsive to detecting an attempt 103 to write a known fraudulent affiliate identifier 111 to a cookie 105.

Figure 4:
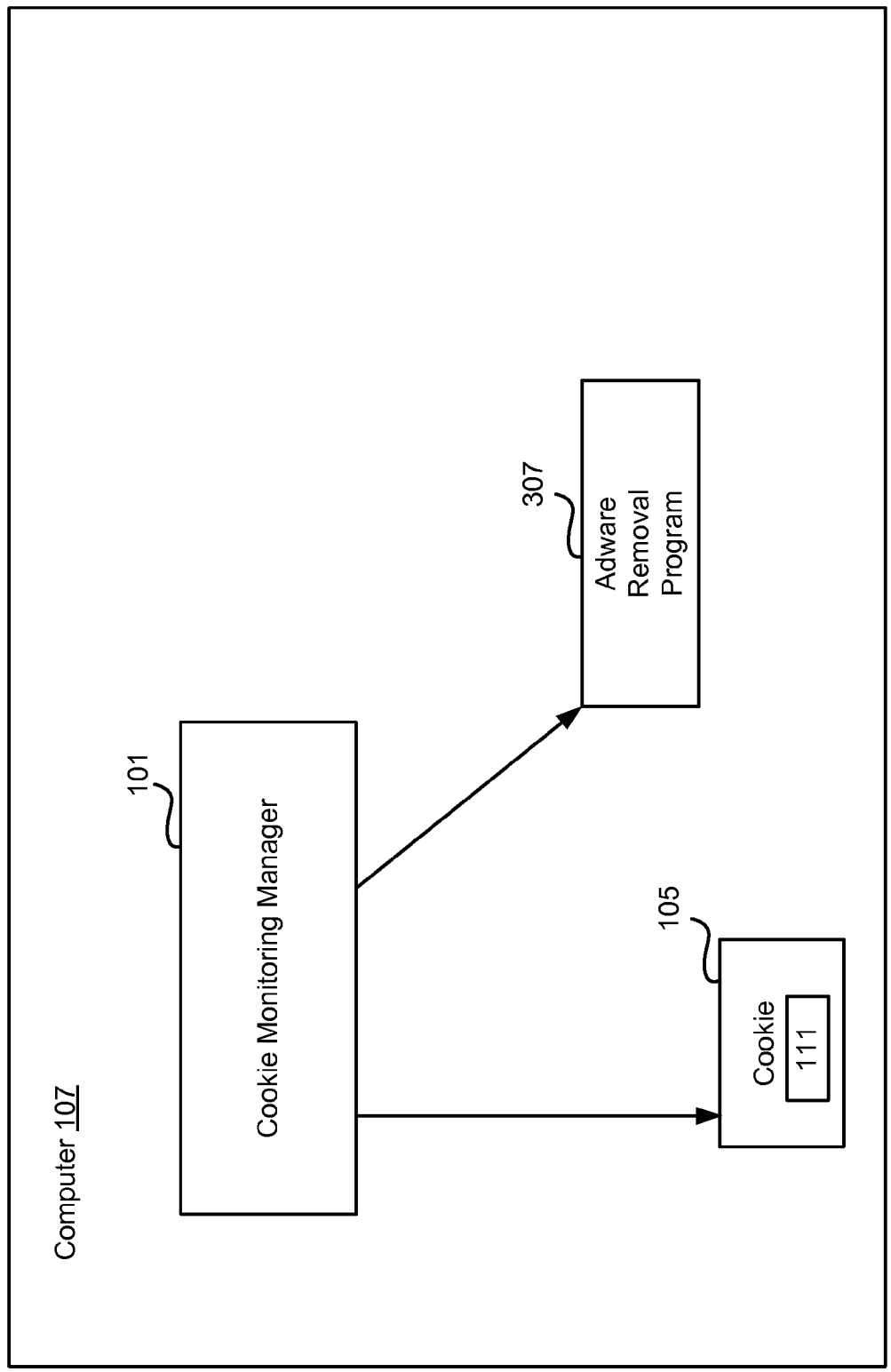
FIG. 4 is a block diagram illustrating the cookie monitoring manager periodically scanning cookies for known fraudulent affiliate identifiers and running adware removal software on the computer, according to some embodiments of the present invention.

Turning now to FIG. 4, the cookie monitoring manager 101 can also periodically scan cookies 105 on the computer 107 for known fraudulent affiliate identifiers 111, and, responsive to detecting a known fraudulent affiliate identifier 111 in at least one cookie 105, run an adware removal program 307 on the computer 107. In other words, the presence of the fraudulent affiliate identifiers 111 themselves are used to identify the adware 113 present on the computer 107. A simple quick scan of all the cookies 105 revels the presence of known fraudulent affiliate identifiers 111, which triggers a more intensive system scan and cleanup.

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. In one embodiment, the component is stored in executable format on a computer readable medium and can be executed by a computer processor. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting fraudulent updates to cookies stored on a computer, the method comprising:
   using a computer processor configured to execute method steps, the steps comprising:
      monitoring cookies stored on the computer, the cookies stored by a browser executing on the computer;
      detecting at least one attempted write operation to a cookie;
      determining that at least one detected attempted write operation comprises an attempt to write a fraudulent affiliate identifier to the cookie; and
      performing at least one corrective action responsive to detecting the attempt to write the fraudulent affiliate identifier to the cookie.

2. The method of claim 1 wherein the step of determining that a detected write operation comprises an attempt to write a fraudulent affiliate identifier to the cookie further comprises:
   detecting an attempt to write a known fraudulent affiliate identifier to the cookie.

3. The method of claim 1 wherein the step of determining that a detected write operation comprises an attempt to write a fraudulent affiliate identifier to the cookie further comprises:
   detecting an attempt to write to a cookie by a process other than the browser.

4. The method of claim 1 wherein the step of determining that a detected write operation comprises an attempt to write a fraudulent affiliate identifier to the cookie further comprises:
   detecting multiple attempts to write affiliate identifiers to the cookie within a specified period of time.

5. The method of claim 1 wherein the step of monitoring cookies further comprises:
   intercepting calls to system write operations; and
   examining intercepted write operations to monitor for attempts to write to known cookies.

6. The method of claim 1 wherein the step of monitoring cookies further comprises:
   utilizing a file system filter driver to monitor for attempts to write to known cookies.

7. The method of claim 1 wherein performing at least one corrective action responsive to detecting the attempt to write the fraudulent affiliate identifier to the cookie comprises performing at least one step from a group of steps consisting of:
   blocking the attempt to write the fraudulent affiliate identifier to the cookie; and
   deleting the fraudulent affiliate identifier from the cookie.

8. The method of claim 1 further comprising:
   maintaining a list of known fraudulent affiliate identifiers, wherein an attempted write operation is determined to be an attempt to write the fraudulent affiliate identifier to the cookie responsive to an affiliate identifier used in the attempted write operation being in the list of known fraudulent affiliate identifiers.

9. The method of claim 8 wherein:
   the list further comprises associations between known fraudulent affiliate identifiers and signatures identifying associated adware programs.

10. The method of claim 9 further comprising:
    responsive to detecting an attempt to write a known fraudulent affiliate identifier to a cookie,
    running an adware removal program to remove at least adware with the associated identifying signature from the computer.

11. The method of claim 9 further comprising:
    scanning cookies stored on the computer for known fraudulent affiliate identifiers; and
    responsive to detecting a known fraudulent affiliate identifier in at least one cookie, running an adware removal program to remove at least adware with the associated identifying signature from the computer.

12. A computer readable medium containing executable program code for detecting fraudulent updates to cookies stored on a computer, the computer readable medium containing program code for:
    monitoring cookies stored on the computer, the cookies stored by a browser executing on the computer;

detecting at least one attempted write operation to a cookie;

determining that at least one detected attempted write operation comprises an attempt to write a fraudulent affiliate identifier to the cookie; and performing at least one corrective action responsive to detecting the attempt to write the fraudulent affiliate identifier to the cookie.

13. The computer readable medium of claim 12 wherein the program code for determining that a detected write operation comprises an attempt to write a fraudulent affiliate identifier to the cookie further comprises:

program code for detecting an attempt to write a known fraudulent affiliate identifier to the cookie.

14. The computer readable medium of claim 12 wherein the program code for determining that a detected write operation comprises an attempt to write a fraudulent affiliate identifier to the cookie further comprises:

program code for detecting an attempt to write to a cookie by a process other than the browser.

15. The computer readable medium of claim 12 wherein the program code for determining that a detected write operation comprises an attempt to write a fraudulent affiliate identifier to the cookie further comprises:

program code for detecting multiple attempts to write affiliate identifiers to the cookie within a specified period of time.

16. The computer readable medium of claim 12 wherein the program code for further performing at least one corrective action responsive to detecting the attempt to write the fraudulent affiliate identifier to the cookie comprises program code for performing at least one step from a group of steps consisting of:

blocking the attempt to write the fraudulent affiliate identifier to the cookie; and deleting the fraudulent affiliate identifier from the cookie.

17. A computer system for detecting fraudulent updates to cookies stored on a computer, the computer system comprising:

a computer readable medium storing executable software portions, comprising:

a software portion configured to monitor cookies stored on the computer by a browser executing on the computer;

a software portion configured to detect at least one attempted write operation to a cookie;

a software portion configured to determine that at least one detected attempted write operation comprises an attempt to write a fraudulent affiliate identifier to the cookie; and a software portion configured to perform at least one corrective action responsive to detecting the attempt to write the fraudulent affiliate identifier to the cookie.

18. The computer system of claim 17 wherein the software portion configured to determine that a detected write operation comprises an attempt to write a fraudulent affiliate identifier to the cookie is further configured to:

detect an attempt to write a known fraudulent affiliate identifier to the cookie.

19. The computer system of claim 17 wherein the software portion configured to determine that a detected write operation comprises an attempt to write a fraudulent affiliate identifier to the cookie is further configured to:

detect an attempt to write to a cookie by a process other than the browser.

20. The computer system of claim 17 wherein the software portion configured to determine that a detected write operation comprises an attempt to write a fraudulent affiliate identifier to the cookie is further configured to:

detect multiple attempts to write affiliate identifiers to the cookie within a specified period of time.

21. The computer system of claim 17 wherein the software portion configured to further perform at least one corrective action responsive to detecting the attempt to write the fraudulent affiliate identifier to the cookie further comprises a software portion configured to perform at least one step from a group of steps consisting of:

blocking the attempt to write the fraudulent affiliate identifier to the cookie; and deleting the fraudulent affiliate identifier from the cookie.

22. A computer system for detecting fraudulent updates to cookies stored on a computer, the computer system comprising:

a cookie monitoring manager executable by a computer processor for:

monitoring cookies stored on the computer by a browser executing on the computer;

detecting at least one attempted write operation to a cookie;

determining that at least one detected attempted write operation comprises an attempt to write a fraudulent affiliate identifier to the cookie; and performing at least one corrective action responsive to detecting the attempt to write the fraudulent affiliate identifier to the cookie; and a computer processor for executing the cookie monitoring manager.

23. The computer system of claim 22 wherein the cookie monitoring manager is further configured for:

detecting an attempt to write a known fraudulent affiliate identifier to the cookie.

24. The computer system of claim 22 wherein the cookie monitoring manager is further configured for:

detecting an attempt to write to a cookie by a process other than the browser.

25. The computer system of claim 22 wherein the cookie monitoring manager is further configured for:

detecting multiple attempts to write affiliate identifiers to the cookie within a specified period of time.

26. The computer system of claim 22 wherein the cookie monitoring manager is further configured for performing at least one step from a group of steps consisting of:

blocking the attempt to write the fraudulent affiliate identifier to the cookie; and deleting the fraudulent affiliate identifier from the cookie.

* * * * *